(12) United States Patent
Caron et al.

(10) Patent No.: US 7,647,724 B2
(45) Date of Patent: Jan. 19, 2010

(54) IRRIGATION MAT AND METHOD OF USE

(75) Inventors: Jean Caron, St-Romuald (CA);
François Pepin, Montréal (CA);
Richard Théoret, St-Colomban (CA)

(73) Assignee: Universite Laval (CA)

( * ) Notice: Subject to any disclaimer, the term of this patent is extended or adjusted under 35 U.S.C. 154(b) by 780 days.

(21) Appl. No.: 11/360,332

(22) Filed: Feb. 23, 2006

(65) Prior Publication Data

US 2006/0201061 A1  Sep. 14, 2006

(30) Foreign Application Priority Data

Feb. 23, 2005 (CA) .................................. 2498077
Sep. 6, 2005 (CN) .................... 2001510099499.7

(51) Int. Cl.
*A01G 9/24* (2006.01)
(52) U.S. Cl. .................................................. 47/1.01 R
(58) Field of Classification Search .................. 47/48.5, 47/59 R, 59 S, 60, 61, 62 C, 62 E, 62 H, 47/62 R, 63, 79, 81; 239/1, 201, 542
See application file for complete search history.

(56) References Cited

U.S. PATENT DOCUMENTS

| 3,830,067 | A | * | 8/1974 | Osborn et al. ................. 405/45 |
| 3,888,041 | A | * | 6/1975 | Seith et al. ........................ 47/9 |
| 4,044,501 | A | * | 8/1977 | Frydryk ........................... 47/32 |
| 4,166,580 | A | * | 9/1979 | Meckel ......................... 239/542 |
| 4,955,158 | A | * | 9/1990 | Lyon .............................. 47/81 |
| 5,133,151 | A | * | 7/1992 | Blok .............................. 47/64 |
| 5,611,369 | A | * | 3/1997 | Hamann, Jr. ............. 137/561 A |
| 6,178,691 | B1 | * | 1/2001 | Caron et al. .................... 47/79 |
| 6,293,477 | B1 | * | 9/2001 | Chambers .................... 239/542 |
| 6,763,601 | B1 | * | 7/2004 | Turley .......................... 33/566 |
| 2003/0213171 | A1 | * | 11/2003 | Kruer et al. ................. 47/62 E |
| 2005/0268552 | A1 | * | 12/2005 | Caron et al. .................... 47/81 |
| 2006/0185241 | A1 | * | 8/2006 | Theoret et al. ................. 47/79 |
| 2006/0201061 | A1 | * | 9/2006 | Caron et al. .................... 47/79 |
| 2007/0280782 | A1 | * | 12/2007 | Rogers et al. ................. 404/35 |
| 2009/0134242 | A1 | * | 5/2009 | Theoret et al. .............. 239/201 |

FOREIGN PATENT DOCUMENTS

EP  1695615 A1 * 8/2006

* cited by examiner

*Primary Examiner*—Francis T Palo
(74) *Attorney, Agent, or Firm*—Cantor Colburn LLP

(57) ABSTRACT

An irrigation mat is comprised of a water impermeable base sheet, a water permeable top sheet and a capillary mat disposed between the base sheet and the top sheet. One or more flat pliable optional drip tapes are loosely disposed between the top sheet and the capillary mat and displaceable therebetween to any desirable position. The drip tape is a hollow flat tube constructed of perforated plastics material and extends at least a full length of the irrigation mat. The irrigation mat with the drip tapes is capable of being rolled up upon itself to form a roll. The top sheet is also heat fused to the folded edges of the back sheet.

15 Claims, 2 Drawing Sheets

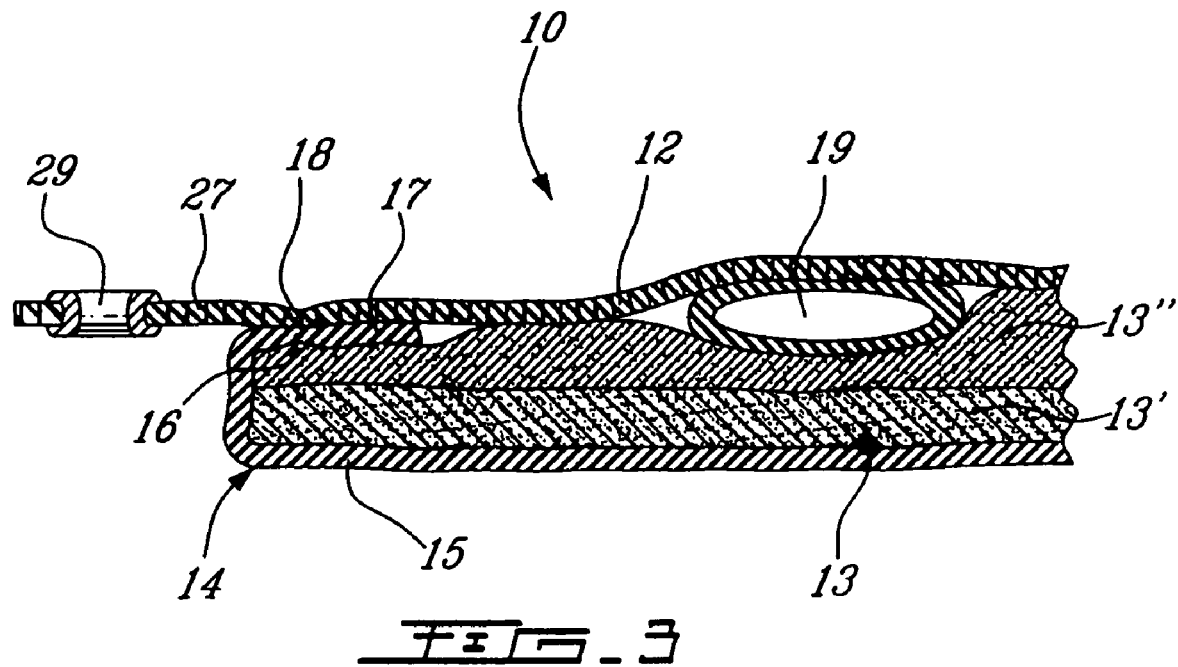
FIG_3
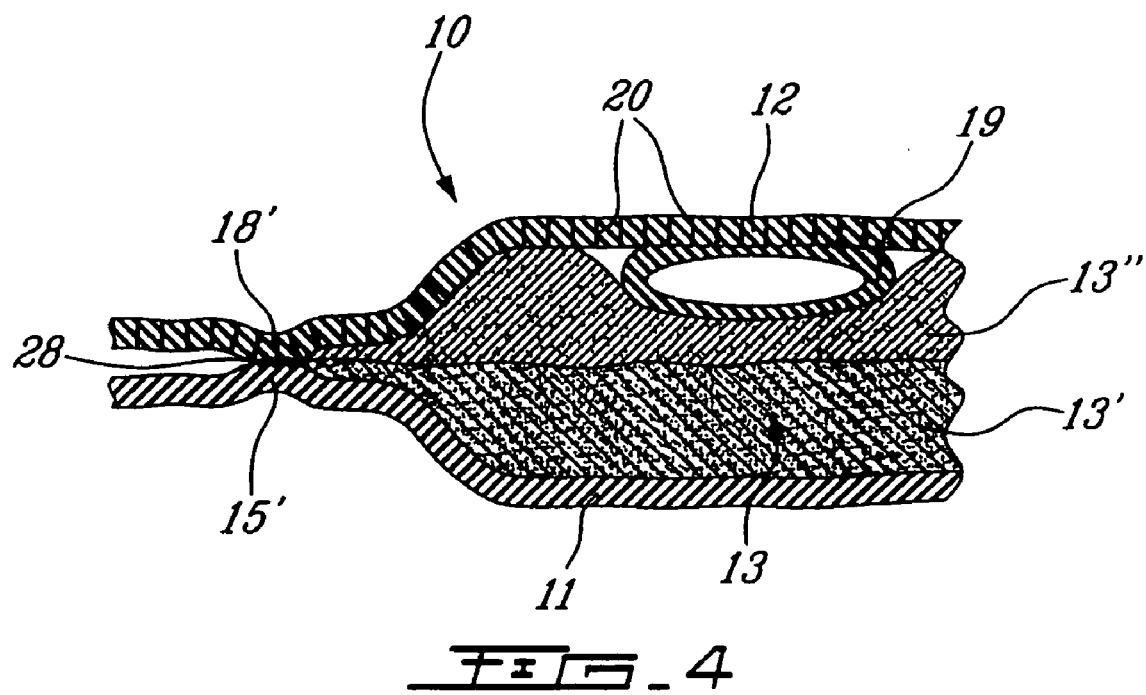
FIG_4

IRRIGATION MAT AND METHOD OF USE

TECHNICAL FIELD

The present invention relates to an irrigation mat comprised of a base sheet, a water permeable top sheet and a capillary mat sandwiched therebetween together with one or more optional flat pliable drip tapes disposed loosely over the capillary mat and which act as water conduits to supply water to the capillary mat and wherein the mat (and optional drip tapes) that can be rolled together in a bundle.

BACKGROUND ART

Reference is made to PCT Application WO 2004/056172 filed Dec. 23, 2002 and relating to an irrigation mat for irrigating potted plants. Water is supplied to the irrigation mat by overhead sprinklers and the mats absorb and retain water and feed the potted plants through holes formed at the bottom of the pots. The present invention is an improvement of this type of irrigation mat.

There is further described in U.S. Pat. No. 5,839,659 a capillary root zone irrigation system utilizing an irrigation mat. The irrigation mat is also provided with a capillary cloth sandwiched between a polyethylene base sheet and a top weed mat. Water is supplied to the capillary cloth by polyethylene rigid pipes which have perforations therein. A disadvantage of such an irrigation mat is that the mat must be assembled on site with rigid water supply pipes. Accordingly, the mat may be rolled up for shipping and storage but it is up to the user to purchase perforated pipes and assemble them in pockets which are stitched along the top layer of the mat. Accordingly, the mat cannot be rolled with the pipes and must be sold separately. The construction of the mat is also expensive as one needs to stitch channels at spaced apart intervals within the mat. Often there are too many channels and too much water supplied to the mat. For long spans of mats, it is also necessary to form joints between PVC pipes to weld them together whereby to span the entire mat. This is a time-consuming job. Also, these pipes cause the mat to bulge on the top surface thereof making that part of the mat non-usable for laying pots thereover. Accordingly, it is not practical for use in nurseries.

Finally, installation of very long capillary mats in the field or on greenhouses benches is not recommended, as plant root diseases may spread over large surfaces. Also, water may drain from upward to downward position, increasing the risk of non-uniform water distribution between pots. Therefore, it is preferable to have smaller pieces of mat neighboring each other for a better uniformity of water distribution between pots. However, placing smaller pieces of mat together in a uniform assemblage is time and resources consuming and not practical in nurseries and greenhouses.

SUMMARY OF INVENTION

It is a feature of the present invention to provide an irrigation mat which substantially overcomes the above-mentioned disadvantage of the prior art and which is an improvement thereover and wherein the mat includes in combination drip tapes which are displaceable therein and an assemblage which permits the mat to be rolled together with optional drip tapes for shipping and storage.

Another feature of the present invention is to provide an irrigation mat wherein the top surface of the mat is fully usable and substantially flat and wherein the drip tapes can be positioned at any desired location between the top sheet of the mat and the capillary mat therein.

Another feature of the present invention is to provide an irrigation mat which is easy to install over a ground surface or a hard support surface such as a potting bench as found in nurseries, with and without drip tapes.

Another feature of the present invention is to provide a method of installing an irrigation mat and wherein irrigation drip tapes are incorporated therein.

According to the above features, for a broad aspect, the present invention provides an irrigation mat which comprises a base sheet, a water permeable, root shielding, top sheet and a capillary mat disposed between the base sheet and the top sheet. The capillary mat has a bottom absorbent material with high capillary properties permitting circulation of water in all directions therein and a fluffy textile top layer material bonded to the bottom absorbent material and separating the bottom absorbent material from the top sheet. The base sheet, top sheet and capillary mat are secured together at least along opposed overlapped side edges thereof by a securement seam. Optional flat pliable drip tapes may be loosely disposed between the top sheet and the fluffy textile top layer and displaceable therebetween to any desirable position. The drip tape is a hollow flat tube constructed of perforated plastics material. The drip tape extends between opposed open ends of the irrigation mat between the securement seams. The irrigation mat is capable of being rolled upon itself with the drip tapes therein.

BRIEF DESCRIPTION OF DRAWINGS

A preferred embodiment of the present invention will now be described with reference to the accompanying drawings in which:

FIG. 3 is a fragmented sectional end view showing an irrigation mat constructed in accordance with a preferred embodiment of the present invention; and FIG. 4 is a view similar to FIG. 3, but showing a modification of the irrigation mat of the present invention.

DESCRIPTION OF PREFERRED EMBODIMENTS

Figure 1:
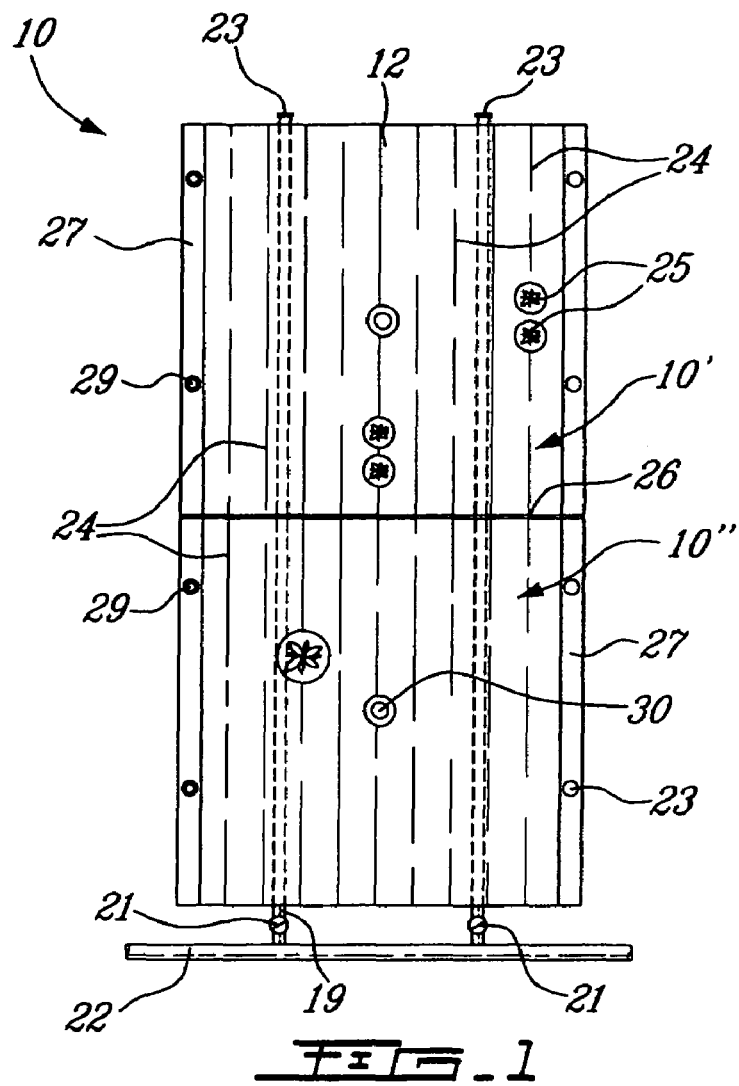
FIG. 1 is a plan view showing an irrigation mat constructed in accordance with the present invention disposed on a flat support surface.

Referring to FIGS. 1 to 4, there is shown generally at 10, the irrigation mat of the present invention. It is comprised of a water impermeable base sheet 11. Sheet 11 may alternatively have holes or slits in an amount small enough to allow a very slow seepage of water from the mat to the ground but the holes are not large enough to allow a good contact with the underneath soil. A water permeable top sheet 12 and a capillary mat 13 disposed between the base sheet and the top sheet. The capillary mat has a bottom absorbent material 13' having high capillary properties whereby to permit circulation of water in all directions therein. The top part of the capillary mat is a compressible material, herein a fluffy textile layer 13" which is bonded to the absorbent material 13', either by needle stitching or otherwise and separates the bottom absorbent material from the top sheet 12. The top sheet 12 has holes therein in the range of from about 10 to 50 microns to allow proper capillary rise of water from the mat to irrigate the roots of potted plants placed thereon, through the hole in the bottom of such pots. The density of these holes may vary on the surface to control the irrigation rate on defined areas of the mat 10 depending on the specific use thereof. Larger size holes have not been found effective, by experimentation.

The base sheet 11, the top sheet 12 and the capillary mat 13 are secured together at least along opposed overlapped side edges 14 thereof by securement means in the form of heat seals 15 which seal the base sheet 11 to the bottom absorbment material 13'. A seal 16 connects a folded-over elongated edge portion 17 of the back sheet 15 to the top fluffy textile layer 13". A further seal 18 seals the top sheet 12 to the folded edge portion 17.

One or more flat pliable drip tapes 19 are disposed between the top fluffy textile layer 13" of the capillary mat and the top sheet 12. The drip tapes extend the entire length of the irrigation mat. These drip tapes may also be positioned over the capillary mat 13 before the top sheet 12 is heat fused to the folded edge portions of the base sheet. The drip tapes are fabricated as hollow flat plastic tubes which are perforated with holes 20 thereabout whereby to distribute water over the capillary mat 13.

As shown in FIG. 1, the drip tapes 19 are provided with valve connectors or straight connectors 21 at one end which interconnect to a water distribution pipe 22. The other ends of the drip tapes 19 are provided with plugs 23. Water distribution can be controlled by either controlling the water supplied to the water distribution pipe 22 or by remotely controlling or manually controlling the valves 21. As also shown in FIG. 1, the top sheet 12 is provided with printed lines 24 to provide for the alignment of potted plants 25 disposed thereover. The top sheet 12 is a UV resistant permeable woven textile sheet which permits water to seep through the sheet or to move upward to the bottom of the pot while preventing plant roots from penetrating the sheet.

The fluffy textile top layer 13" is a compressible textile material whereby when compressed by the weight of the flat pots 25 disposed on the top sheet 12, causes water from the bottom absorbent material 13' of the capillary mat to flow into the pot by capillary attraction and penetrate into the pot through openings provided therein and not hereinshown but forming part of the above-referred to PCT application. The capillary mat 13 has a water holding capacity of up to 2.5 gallons per square yard (11.6 liters per square meter). The base sheet 11 is a water impermeable sheet constructed of polyethylene film material.

As also shown in FIG. 1, the irrigation mat 10 may be comprised by two or more distinct mat sections 10' and 10" which are disposed side-by-side and interconnected by a fused joint 26 formed between opposed back sheets and opposed top sheets. Each mat sections 10' and 10" may have a length of about 10 feet and create individual water retention cells which are useful in preventing the transmission of root disease from one cell to the other and to maintain good water distribution on sloping surfaces. The drip tapes as herein shown are one-inch wide tapes and have a drip flow rate of, for example, 1.5 gallons per minute per 100 linear feet, more or less.

As also shown in FIGS. 1 and 3, the top sheet 12 defines an extension flap 27 extending beyond the weld seam or the seal 18 and are provide with ferrule ring connectors 29 for attachment of the irrigation mat by attachment means, such as large nails or pegs or screws, to secure the mat on a support surface. The support surface may be a ground surface or a support bench. The top sheet flap 27 can also be turned about the overlapped side edge 14 and welded to the base sheet 11.

Figure 2:
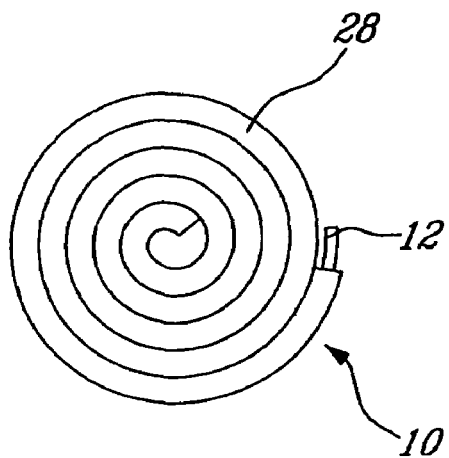
FIG. 2 is an end view showing an irrigation mat of the present invention incorporating therein one or more water distribution drip tapes and rolled up upon itself to form an irrigation mat roll for shipping and storage.

An advantage of the construction of the irrigation mat of the present invention with the integrated drip tapes is that the mat can be rolled up upon itself to form a roll 28 as illustrated in FIG. 2. Accordingly, these rolls are easily storable, are easy to ship and the user does not require assembly other than to connect plugs 23 and connectors 19 to interconnect the mat to water distribution pipes. The mat of the present invention is also economical to construct and the drip tapes are displaceable to any desired position between the top sheet and the capillary mat.

In the embodiment as shown in FIG. 4, the top sheet 12 may be connected directly to the capillary mat 13 by a heat weld seam 18' whereby the top sheet 12 melts into the fluffy synthetic textile top layer 13" of the capillary mat. A similar heat fuse seam 15' may be formed with the bottom sheet 11 fused into the bottom absorbent material 13" of the synthetic capillary material. This forms a compressed seal area 28 substantially preventing water from seeping out from opposed side edges of the irrigation mat.

Similar ferrules may be connected in the irrigation mat such as shown at 30 whereby to form a channel between the top and bottom sheets to expel water collecting on the mat whereby the water can seep through the mat and onto the ground or other support surface. The ferrule ring connectors 30 may be provided at spaced intervals over the surface of the mat sections.

It is within the ambit of the present invention to cover any obvious modifications of the preferred embodiment described herein, provided such modifications fall within the scope of the appended claims.

The invention claimed is:

1. An irrigation mat comprising a base sheet, a water permeable, root shielding, top sheet and a capillary mat disposed between said base sheet and top sheet; the top sheet comprising a textile fabric defining holes sized in the range of from about 10 to 50 microns so as to permit water to seep through in at least one of drainage and capillary movement, and to prevent roots from passing therethrough said capillary mat having a bottom absorbent material with high capillary properties permitting circulation of water in all directions therein and a fluffy textile top layer material bonded to said bottom absorbent material and separating said bottom absorbent material from said top sheet; said base sheet, top sheet and capillary mat being secured together at at least along opposed overlapped side edges thereof by a securement seam; one or more flat pliable drip tapes loosely disposed between said top sheet and said fluffy textile top layer and displaceable therebetween to any desirable position, said drip tape being a hollow flat tube constructed of perforated plastics material, said drip tape extending between opposed open ends of said irrigation mat between said securement seams, said irrigation mat being capable of being rolled upon itself with said drip tapes therein.

2. An irrigation mat as claimed in claim 1 wherein said base sheet is a water impermeable base sheet.

3. An irrigation mat as claimed in claim 1 wherein said base sheet is provided with small holes or slits to allow slow seepage of water.

4. An irrigation mat as claimed in claim 1 wherein said top sheet a woven fabric made of a UV-resistant material.

5. An irrigation mat as claimed in claim 4 wherein said fluffy textile top layer is a compressible textile material whereby when compressed by the weight of plant pots disposed on said top sheet will cause capillary flow of water from said bottom absorbent material to a compressed mat area under said pot to feed roots of a plant disposed in a pot forming said compressed mat area.

6. An irrigation mat as claimed in claim 5 wherein said mat has a water holding capacity of up to 2.5 gallons per square yard (11.6 liters/sq. meters), said base sheet being a polyethylene film sheet.

7. An irrigation mat as claimed in claim 5 wherein said capillary mat comprises at least two distinct mat sections disposed side-by-side.

8. An irrigation mat as claimed in claim 7 wherein said mat sections have a length of about 10 feet, said mat sections creating individual water retention cells preventing the transmission of foliar disease from one cell to the other.

9. An irrigation mat as claimed in claim 1 wherein said drip tape is a one-inch wide tape of plastics material having a drip flow rate of 1.5 gpm/100 linear feet.

10. An irrigation mat as claimed in claim 1 wherein said one or more drip tapes extend at least the full length of said irrigation mat, each tape having a plug at one open end thereof and a connector at an opposed open end thereof for connection to a water feed line for receiving water.

11. An irrigation mat as claimed in claim 1 wherein said securement means is comprised by juxtaposed heat weld seams formed on outer surfaces of said top sheet and base sheet which are plastics material sheets and a melt bond between an inner surface of said top sheet and base sheet with opposed surfaces of said capillary mat, said capillary mat being constructed of polymer material.

12. An irrigation mat as claimed in claim 11 wherein one of said top sheets define an extension flap extending beyond said weld seams to provide for an attachment of said irrigation mat by attachment means securable in a support surface.

13. An irrigation mat as claimed in claim 1 wherein said top sheet and base sheet are interconnected at spaced intervals, through said capillary mat, by ferrule ring connectors to provide for drain holes through said irrigation mat to channel water from a top side of said sheet through said irrigation mat.

14. An irrigation mat as claimed in claim 1 wherein said top sheet is provided with printed lines to provide for the alignment of potted plants disposed thereon.

15. An irrigation mat as claimed in claim 1 wherein said water impermeable base sheet has an elongated edge portion folded over a side marginal area of said capillary mat on opposed longitudinal sides thereof to form a seal along opposed longitudinal edges of said capillary mat, said elongated edge portion being heat fused to said fluffy textile top layer material of said capillary mat, said securement means being constituted by a heat weld seam formed between opposed longitudinal edge portions of said top sheet with respective ones of said folded over elongated edge portions of said base sheet, and a further heat weld seam along each of opposed edge portions of said base sheet with said bonded absorbent material of said capillary mat.

* * * * *